June 26, 1951 R. W. BAILEY 2,558,121
FISHING LURE
Filed Feb. 6, 1948
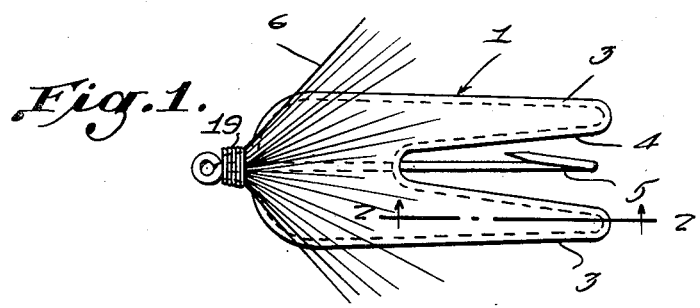
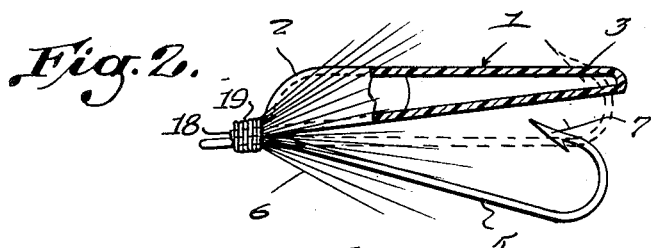
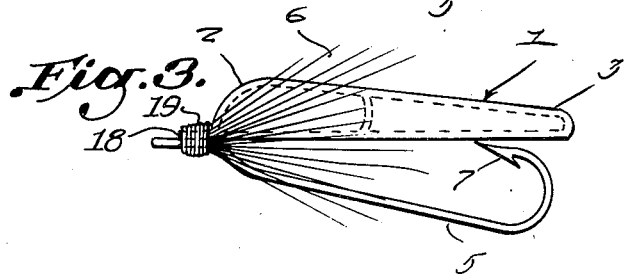
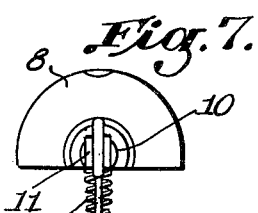
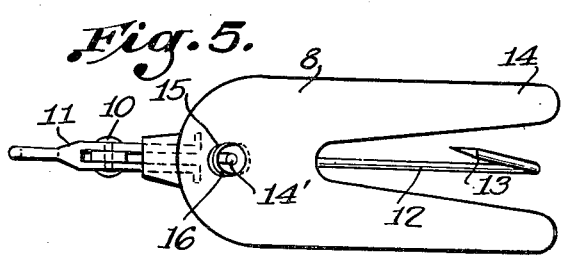
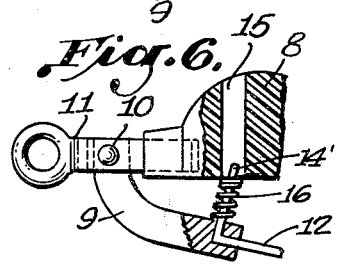
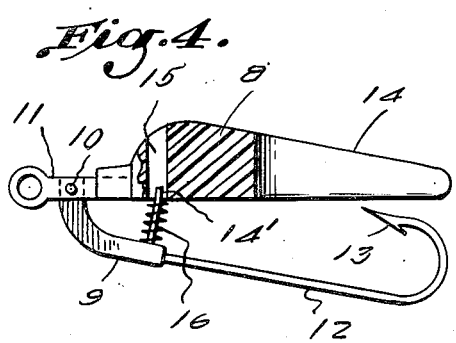
INVENTOR.
Raymond W. Bailey
BY
McMorrow, Berman & Davidson
ATTORNEYS Patented June 26, 1951

2,558,121

UNITED STATES PATENT OFFICE 2,558,121

FISHING LURE

Raymond W. Bailey, Akron, Ohio

Application February 6, 1948, Serial No. 6,605

3 Claims. (Cl. 43—42.41)

The present invention relates to improvements in a fishing lure.

The primary object of the invention is to provide a device of this nature having a body of such material or formation as to render the same buoyant in water in order to support the hook in proper position when the device is in use.

Another object of the invention is to provide a device of this character so constructed that the barb of the hook will be so positioned relative to the body that the danger of the same becoming entangled with weeds, roots and the like is positively prevented.

Still another object of the invention is to provide a device of this kind which is extremely simple in construction, efficient in operation, and one which can be manufactured at a minimum cost.

With these and other objects in view, this invention resides in the novel features of construction, formation, combination and arrangement of parts to be hereinafter more fully described, claimed and illustrated in the accompanying drawing, in which:

Figure 1 is a top plan view of a fish lure illustrative of the invention.

Figure 2 is a side elevational view, partly in section.

Figure 3 is a side elevation of a slightly modified form of fish lure illustrative of the invention.

Figure 4 is a side view, partly in section, of a further modified form of fish lure illustrative of the invention.

Figure 5 is a bottom plan view of the lure shown in Figure 4.

Figure 6 is a side elevation of a fragmentary front portion of the lure; and

Figure 7 is a front view of the lure.

Referring to the drawing, 1 designates the body formed of a buoyant material or of hollow formation to render it buoyant. This body includes a forward section 2 and a rear section having a longitudinally elongated opening therein. Such opening may be provided by forming the rear section as a pair of rearwardly extending legs 3—3 of tapered formation. These legs, as clearly shown in Figure 1, are spaced apart and have their adjacent sides separated to provide an elongated space 4 therebetween.

The shank 5 of the hook is resiliently connected to the forward end of the body section 2 so that the hook is normally held with its point slightly below the bottom side of the body and opposite the space between the two legs of the body, but can be forced upwardly through the opening in the body exposing the barb at the top of the body, as shown in broken lines in Figure 2, when the lure is taken into the mouth of a fish, and if desired, feathers 6 or the like can be connected at this point, as is customary. In the arrangement shown in Figures 1 to 3 inclusive, the body is provided at its forward end with a small extension or nose 18 and a wrapping 19 is provided around this extension and the shank of the hook and resiliently secures the hook to the body. The body is also tapered in thickness from its forward to its rearward end and has a flat undersurface overlying hook 5. By disposing the barb 7 of the hook slightly below the lower surface of the body with the barb 7 aligned with the space between the legs, the body constitutes an efficient weed guard for the hook.

In the form shown in Figure 4 the body 8 has an arcuate arm 9 pivoted, as at 10, to the line connecting bar 11, and to this bar is fixed the forward end of the shank 12 of the hook, the barb 13 of the hook being disposed below the bottom plane of the body.

Carried by the bar 9 is a pin 14' adapted to slidably engage in a slot 15 formed in body 8.

Surrounding the pin 14' and interposed between the lower surface of the body and upper edge of the arm 9 is a coiled compression spring 16 which resiliently holds the hook in position so that its barb is adjacent the bottom side of the body and opposite the space between the two body legs. This spring may be connected at one end to the body and at its opposite end to the hook to hold the hook in normal position or the pivotal connection between the hook and the body may be constructed to limit movement of the hook away from the body. Since the arm 9 is pivotally connected with the body, the shank 12 can swing upwardly against the tension of the spring 16 upon encountering weeds or when the lure is taken by a fish.

In all forms the hook shanks are disposed relative to the bodies in such manner as to prevent weeds and the like from lodging on the barbs of the hooks.

It will be noted that the body of the lure is above the point of the hook barb in order that the center of gravity is low enough to assure that the barb point will be positioned upwardly at all times to enable the lure to pass through or over obstructions without the danger of the barb becoming entangled therewith.

What is claimed is:

1. A fish lure comprising an elongated buoyant body having at one end a formation providing a pair of elongated legs extending rearwardly from the body and separated by an elongated opening, said body having a flat under surface and an extension at its forward end, a hook underlying said body with its shank extending longitudinally of the body medially of said flat under surface, and a binding around said extension and said hook shank holding said hook to said body with its shank spaced from the under surface of said body and its point adjacent said opening and positioned to pass through said opening to a position above the upper surface of said body when said shank is moved toward the under surface of said body, said binding resiliently resisting movement of said shank toward the under surface of said body and consequent passage of said point through said opening to a position above the upper surface of said body.

2. A fish lure comprising an elongated buoyant body having at one end a formation providing a pair of elongated legs extending rearwardly from the body and separated by an elongated opening, said body having a flat under surface and a rounded upper surface, a hook underlying said body with its shank extending longitudinally of the body medially of said flat under surface, and means connecting said hook shank to said body at the forward end of the latter comprising a bar projecting forwardly from the front end of said body, a curved arm pivotally connected at one end to said bar and rigidly connected at its opposite end to said hook shank rearwardly of the front end of said body, said arm having a limited freedom of pivotal movement relative to said bar to hold said hook shank spaced from the under surface of said body and the hook point adjacent the under surface of said body and in position to pass through the opening between said legs to a position above the upper surface of said body upon movement of said shank toward the under surface of said body, said body having a slot therein adjacent said opposite end of said arm, a pin projecting from said arm into said slot, and a compression spring surrounding said pin between said arm and said body to resiliently resist movement of said hook shank toward said body and consequent passage of said hook point through the opening between said legs to a position above the upper surface of said body.

3. A fish lure comprising an elongated buoyant body having at one end a formation providing a pair of elongated legs extending rearwardly from the body and separated by an elongated opening, said body having a flat under surface and an extension at its forward end, a hook underlying said body with its shank extending longitudinally of the body medially of said flat under surface, said hook having a shank with a straight portion curved at the end opposite the point of the hook and terminating in an eye, and a union between said extension and said hook shank holding said hook to said body with its shank spaced from the under surface of said body and its point adjacent said opening and positioned to pass through said opening to a position above the upper surface of said body when said shank is moved toward the under surface of said body, said union resiliently resisting movement of said shank toward the under surface of said body and consequent passage of said point through said opening to a position above the surface of said body.

RAYMOND W. BAILEY.

REFERENCES CITED

The following references are of record in the file of this patent:

UNITED STATES PATENTS

| Number | Name | Date |
| --- | --- | --- |
| 934,087 | Moran | Sept. 14, 1909 |
| 1,686,114 | Walter | Oct. 2, 1928 |
| 2,215,908 | Lauby | Sept. 24, 1940 |
| 2,364,215 | Hobson | Dec. 5, 1944 |